(12) United States Patent
Kunoike et al.

(10) Patent No.: US 10,615,401 B2
(45) Date of Patent: Apr. 7, 2020

(54) CYLINDRICAL BATTERIES

(71) Applicant: Sanyo Electric Co., Ltd., Daito-shi, Osaka (JP)

(72) Inventors: Naoto Kunoike, Osaka (JP); Kyosuke Miyata, Osaka (JP); Oose Okutani, Hyogo (JP); Kazutoshi Kohira, Osaka (JP); Tomohiko Yokoyama, Osaka (JP); Shinya Geshi, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 131 days.

(21) Appl. No.: 15/554,947

(22) PCT Filed: Mar. 10, 2016

(86) PCT No.: PCT/JP2016/001339
§ 371 (c)(1),
(2) Date: Aug. 31, 2017

(87) PCT Pub. No.: WO2016/157749
PCT Pub. Date: Oct. 6, 2016

(65) Prior Publication Data
US 2018/0047973 A1   Feb. 15, 2018

(30) Foreign Application Priority Data

Mar. 27, 2015  (JP) .................. 2015-066234

(51) Int. Cl.
*H01M 2/34* (2006.01)
*H01M 2/02* (2006.01)
(Continued)

(52) U.S. Cl.
CPC .......... *H01M 2/345* (2013.01); *H01M 2/022* (2013.01); *H01M 2/0408* (2013.01);
(Continued)

(58) Field of Classification Search
CPC .... H01M 2/345; H01M 2/1235; H01M 2/022; H01M 2/408; H01M 2/0413
See application file for complete search history.

(56) References Cited

U.S. PATENT DOCUMENTS

| 4,803,136 A | * | 2/1989 | Bowsky | ................ | B65D 83/70 |
| | | | | | 216/54 |
| 5,741,606 A | * | 4/1998 | Mayer | ................ | H01M 2/1229 |
| | | | | | 429/53 |

(Continued)

FOREIGN PATENT DOCUMENTS

| CN | 102136608 A | 7/2011 |
| JP | 6-196150 A | 7/1994 |

(Continued)

OTHER PUBLICATIONS

International Search Report dated Jun. 14, 2016, issued in counterpart International Application No. PCT/JP2016/001339 (2 pages).

(Continued)

*Primary Examiner* — Matthew J Merkling
(74) *Attorney, Agent, or Firm* — Westerman, Hattori, Daniels & Adrian, LLP

(57) ABSTRACT

A cylindrical battery according to an aspect of the present invention includes an electrode assembly including a positive electrode plate and a negative electrode plate wound together via a separator, an electrolytic solution, a bottomed cylindrical housing can, and a sealing unit fixed by crimping of an open end of the housing can via a gasket. The sealing unit includes a valve member having a circular outline, a metal plate connected to a central portion of the valve member so as to be farther inside the battery than the valve member, and an annular insulating member disposed between an outer peripheral portion of the valve member and an outer peripheral portion of the metal plate. The valve (Continued)

member has a sloping region in which the thickness decreases or increases continuously along the radial direction.

6 Claims, 2 Drawing Sheets

(51) Int. Cl.
- H01M 2/04 (2006.01)
- H01M 2/12 (2006.01)
- H01M 10/0587 (2010.01)
- H01M 10/0525 (2010.01)

(52) U.S. Cl.
CPC ..... *H01M 2/1235* (2013.01); *H01M 10/0587* (2013.01); *H01M 10/0525* (2013.01); *H01M 2200/106* (2013.01); *H01M 2220/20* (2013.01); *H01M 2220/30* (2013.01)

(56) References Cited

U.S. PATENT DOCUMENTS

| | | | | |
|---|---|---|---|---|
| 5,853,912 | A * | 12/1998 | Naing | H01M 2/12 429/61 |
| 6,242,126 | B1 * | 6/2001 | Mori | H01M 2/1235 429/53 |
| 8,062,786 | B2 * | 11/2011 | Kim | H01M 2/347 429/156 |
| 2003/0013005 | A1 * | 1/2003 | Chang | H01M 2/1241 429/53 |
| 2010/0291422 | A1 | 11/2010 | Deng et al. | |
| 2011/0183163 | A1 | 7/2011 | Suzuki et al. | |
| 2013/0196191 | A1 * | 8/2013 | Arai | H01M 2/06 429/61 |
| 2016/0301061 | A1 * | 10/2016 | Urano | H01M 2/0217 |
| 2018/0145307 | A1 * | 5/2018 | Kagami | H01M 2/305 |

FOREIGN PATENT DOCUMENTS

| | | |
|---|---|---|
| JP | 7-105933 A | 4/1995 |
| JP | 9-147821 A | 6/1997 |
| JP | 9-199106 A | 7/1997 |
| JP | 2000-149919 A | 5/2000 |
| JP | 2010-272389 A | 12/2010 |
| JP | 2011-150966 A | 8/2011 |

OTHER PUBLICATIONS

English Translation of Chinese Search Report dated Dec. 16, 2019, issued in counterpart CN application No. 201680014383.5. (1 page).

* cited by examiner

CYLINDRICAL BATTERIES

TECHNICAL FIELD

The present invention relates to cylindrical batteries which include a sealing unit having a current interrupt device.

BACKGROUND ART

Sealed batteries are largely classified into cylindrical batteries, prismatic batteries and pouch-type batteries depending on the shapes and materials of housing cases in which an electrode assembly that is the power generation element is accommodated. In particular, cylindrical batteries have found wide use in applications such as electric tools, power-assisted bicycles and electric vehicles. Thus, cylindrical batteries are required to exhibit high safety even when used under severe conditions.

A sealing unit of a cylindrical battery includes safety measures such as an explosion-proof valve, a current interrupt device and a PTC (positive temperature coefficient) element. Patent Literatures 1 to 4 listed later are example documents which disclose such sealing units. A sealing unit disclosed in Patent Literature 4 will be described below with reference to FIG. 6.

The sealing unit illustrated in FIG. 6 is composed of a metal case 66 in the form of a dish and, fitted therein, a stack including a metal plate 65, a valve member 63, a PTC element 62 and a terminal cap 61. A central portion of the valve member 63 is welded to the metal plate 65, and an outer peripheral portion of the valve member is insulated from the metal plate 65 by an insulating gasket 64. The metal plate 65 and the metal case 66 have a vent hole 65a and a vent hole 66a, respectively. This configuration allows the valve member 63 to experience a rise in the pressure inside the battery due to the generation of gas within the battery, and consequently the valve member 63 pulls the weld to the outside of the battery. If the pressure inside the battery reaches a prescribed value, the weld ruptures and the current path between the valve member 63 and the metal plate 65 is interrupted. If the pressure inside the battery continues to rise further, the valve member 63 ruptures starting from a thin portion 63a formed in the valve member 63, releasing the gas within the battery to the outside. This is how the current interrupt device and the explosion-proof valve disposed in the sealing unit are actuated.

While in the above example the weld between the valve member and the metal plate works as a current interrupt section, the current interrupt section may be constituted by a thin portion disposed in the metal plate as described in Patent Literatures 2 and 3. The pressure at which the current interrupt device is actuated depends on the fracture strength of the weld or the thin portion.

CITATION LIST

Patent Literature

PTL 1: Japanese Published Unexamined Patent Application No. 6-196150
PTL 2: Japanese Published Unexamined Patent Application No. 7-105933
PTL 3: Japanese Published Unexamined Patent Application No. 9-147821
PTL 4: Japanese Published Unexamined Patent Application No. 9-199106

SUMMARY OF INVENTION

Technical Problem

Current interrupt devices have a certain range of a variation in actuation pressure. A large variation in actuation pressure causes design limitations such as the precautionary reduction of the preset actuation pressure. Further, a large variation in actuation pressure gives rise to a risk that the current interrupt device may not work stably. Thus, there has been a demand for techniques which reduce the variation in the actuation pressure of current interrupt devices.

The conventional approach to reducing the variation in the actuation pressure of current interrupt devices mainly relies on the optimization of a manner and conditions under which a weld is formed between a valve member and a metal plate or a weakened portion is formed in a metal plate. Few cylindrical batteries suited for reducing the variation in actuation pressure have been presented.

Patent Literature 3 discloses results that show that the variation in the actuation pressure of current interrupt devices is reduced by waving an outer peripheral portion of a valve member. However, the technique of Patent Literature 3 is directed to preventing the occurrence of defective separation of a weld between a valve member and a metal plate during a sealing unit assembling step, and to reliably ensuring insulation between the valve member and the metal plate after the actuation of the current interrupt device. Although Patent Literature 3 indeed describes that the variation in actuation pressure is reduced, it also describes that the actuation pressure itself is increased. That is, the technique of Patent Literature 3 has a difficulty in reducing the variation in actuation pressure while keeping the level of actuation pressure.

The present invention has been made in light of the circumstances discussed above, and has been completed based on a finding that a valve member provided with a sloping region in which the thickness of the valve member changes continuously is deformed stably.

Solution to Problem

To solve the problems discussed above, an aspect of the present invention resides in a cylindrical battery which includes an electrode assembly including a positive electrode plate and a negative electrode plate wound together via a separator, an electrolytic solution, a bottomed cylindrical housing can, and a sealing unit fixed by crimping of an open end of the housing can via a gasket. The sealing unit includes a valve member having a circular outline, a metal plate connected to a central portion of the valve member so as to be farther inside the battery than the valve member, and an annular insulating member disposed between an outer peripheral portion of the valve member and an outer peripheral portion of the metal plate. The valve member has a sloping region in which the thickness decreases or increases continuously along a radial direction.

Advantageous Effects of Invention

According to one aspect of the present invention, the valve member is deformed stably upon increase in pressure inside the battery, and the current interrupt device is actuated with a reduced variation in actuation pressure.

DESCRIPTION OF EMBODIMENTS

Hereinbelow, embodiments of the present invention will be described with respect to nonaqueous electrolyte secondary batteries that are an example of cylindrical batteries. The embodiments described below do not limit the scope of the invention, and the invention may be carried out while changing such embodiments appropriately without departing from the spirit of the invention.

Figure 1:
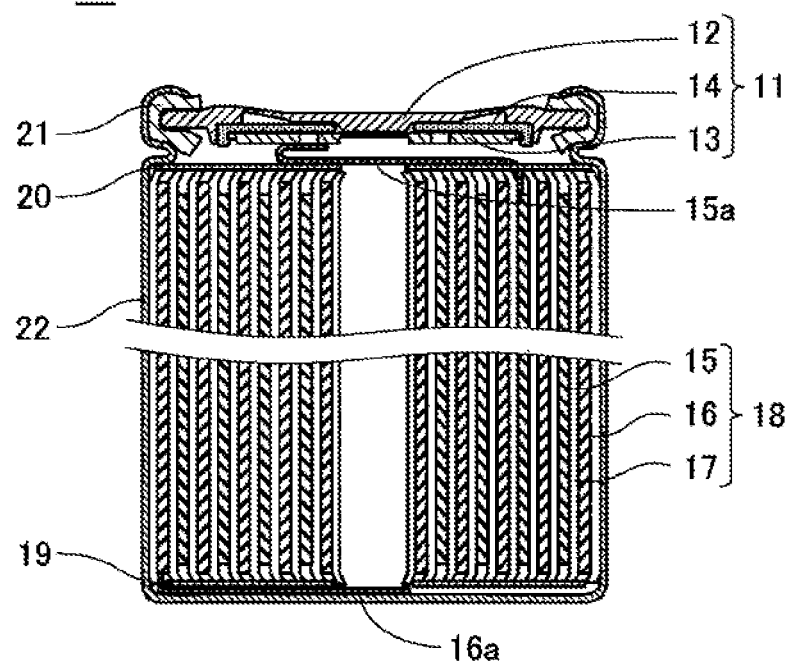
FIG. 1 is a sectional view of a cylindrical nonaqueous electrolyte secondary battery according to an embodiment of the present invention.

In a nonaqueous electrolyte secondary battery 10 illustrated in FIG. 1, an electrode assembly 18 and an electrolytic solution that is not shown are accommodated in a bottomed cylindrical housing can 22. The open end of the housing can 22 is crimped to fix a sealing unit 11 via a gasket 21, thereby sealing the inside of the battery.

Figure 2:
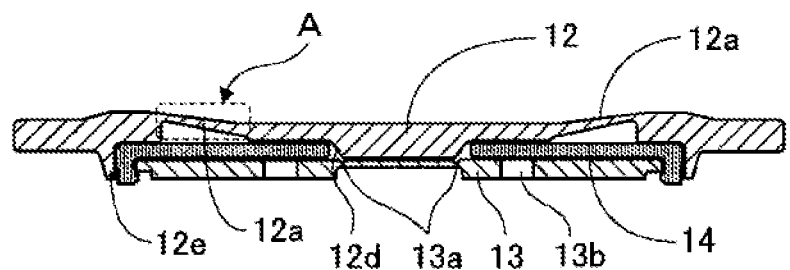
FIG. 2 is a sectional view of a sealing unit according to an embodiment of the present invention.

As illustrated in FIG. 2, the sealing unit 11 is composed of a valve member 12, a metal plate 13 and an annular insulating member 14. The valve member 12 and the metal plate 13 are connected to each other at their central portions, and the insulating member 14 is disposed between an outer peripheral portion of the valve member 12 and an outer peripheral portion of the metal plate 13. The valve member 12 disposed outermost in the sealing unit 11 serves as an external terminal, and the metal plate 13 that is connected to a positive electrode lead 15a extending from the electrode assembly 18 serves as an internal terminal. The sealing unit 11 with the above configuration advantageously attains an outstanding performance in releasing a gas from the inside of the battery in the event of a rupture of the valve member 12.

The current interrupt device is actuated in the following manner. A vent hole 13b is disposed in the metal plate 13 to allow the valve member 12 to experience a rise in the pressure inside the battery. Consequently, as the pressure inside the battery increases, the valve member 12 pulls the portion of the metal plate 13 connected thereto toward the outside of the battery. If the pressure inside the battery reaches a prescribed value, a thin portion 13a of the metal plate 13 that is a weakened portion disposed around the weld with the valve member 12 ruptures to interrupt the current path between the valve member 12 and the metal plate 13. That is, the sealing unit 11 can constitute a current interrupt device as long as it includes these three members, namely, the valve member 12, the metal plate 13 and the annular insulating member 14. In the case where the metal plate 13 has no thin portion, the weld between the metal plate 13 and the valve member 12 may serve as a current interrupt section. It is, however, preferable that a thin portion 13a be formed in the metal plate 13, because it is easier to control the rupture strength of the thin portion than to control the rupture strength of the weld. The thin portion 13a is preferably formed around the portion of the metal plate 13 welded with the valve member 12. The sectional shape of the thin portion 13a is preferably a V-shape or a U-shape.

Figure 4:
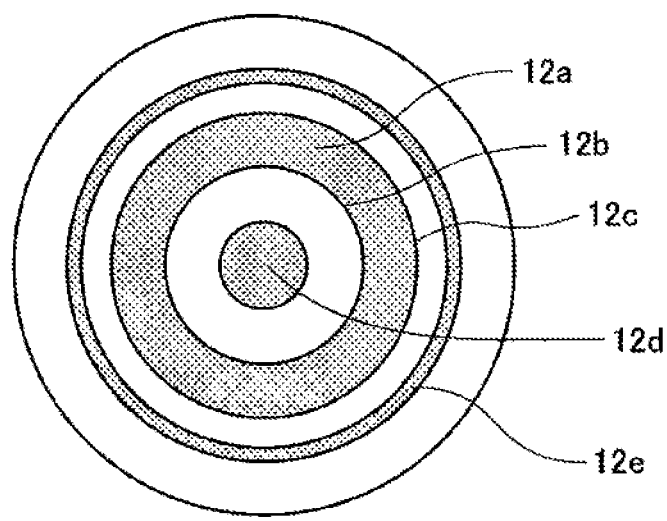
FIG. 4 is a plan view of a sealing unit according to an embodiment of the present invention, viewed from the inside of a battery.

The valve member 12 may be fabricated by pressing a plate material made of aluminum or aluminum alloy. The planar outline of the valve member 12 is a circle. As illustrated in FIGS. 2 and 4, on the side of the valve member 12 that faces the inside of the battery are disposed a sloping region 12a in which the thickness decreases continuously along the radial direction from an inner peripheral portion to an outer peripheral portion, a central projection 12d, and an outer peripheral projection 12e. The central projection 12d facilitates a connection to the metal plate 13 and ensures a space in which the insulating member 14 is disposed between an outer peripheral portion of the valve member 12 and an outer peripheral portion of the metal plate 13. The outer peripheral projection 12e allows the metal plate 13 to be fitted therein via the insulating member 14.

In the present embodiment, the sloping region 12a is formed so that the thickness decreases continuously from an inner peripheral portion to an outer peripheral portion. Thus, the outer peripheral edge portion of the sloping region 12a serves as an origin from which the valve member 12 starts to deform. In the reverse case in which the sloping region 12a is formed so that the thickness of the valve member increases continuously from an inner peripheral portion to an outer peripheral portion, the inner peripheral edge portion of the sloping region 12a will serve as an origin of a deformation of the valve member 12. Of these configurations, the one which is adopted in the present embodiment is more preferable because the valve member 12 can deform more stably. The phrase that "the thickness of the valve member decreases or increases continuously" does not demand that the rate at which the thickness of the valve member changes be constant in the entirety of the sloping region 12a.

Figure 3:
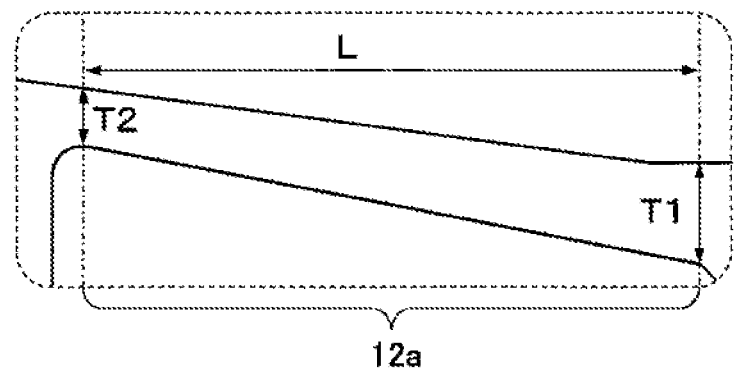
FIG. 3 is an enlarged view of region A illustrated in FIG. 2.

In the present embodiment, the sloping region 12a is formed so as to occupy the region enclosed by an inner peripheral circle 12b and an outer peripheral circle 12c which are concentric with the outline of the valve member 12. As illustrated in FIG. 3, L denotes the length from the inner peripheral edge to the outer peripheral edge of the sloping region 12a along the radial direction of the valve member 12. It is preferable that L be not less than 10% and not more than 90% of the radius of the valve member 12. In the present embodiment, L is constant at any positions and thus the valve member 12 can deform stably as the pressure inside the battery increases.

A groove-shaped thin portion may be formed in the valve member 12. In this case, the valve member 12 serves as an explosion-proof valve more stably. Such a thin portion may be formed inside the sloping region 12a. The sectional shape of the thin portion is preferably a V-shape or a U-shape.

The metal plate 13 may be fabricated from a plate material made of aluminum or aluminum alloy. A vent hole 13b is disposed in the metal plate 13. Laser welding is an example method for connecting the metal plate 13 to the valve member 12.

The insulating member 14 may be any of materials which can ensure insulation between the valve member 12 and the metal plate 13 and do not affect battery characteristics. The material of the insulating member 14 is preferably a polymer resin, with examples including polypropylene (PP) resins and polybutylene terephthalate (PBT) resins.

While the present embodiment illustrates the sealing unit 11 as being composed of the valve member 12, the metal plate 13 and the insulating member 14, the sealing unit may include additional members. Examples of such additional members include a terminal cap and a PTC element. The terminal cap is disposed farther outside the battery than the valve member 12 and serves as an external terminal in place of the valve member 12. While in the present embodiment the metal plate 13 serves as an internal terminal, an additional metal plate may be disposed farther inside the battery than the metal plate 13 to serve as an internal terminal.

Next, the electrode assembly 18 will be described. In the present embodiment, as illustrated in FIG. 1, the electrode assembly 18 is one fabricated by winding a positive electrode plate 15 and a negative electrode plate 16 via a separator 17.

For example, the positive electrode plate 15 may be fabricated as follows. First, a positive electrode active material and a binder are kneaded to uniformity in a dispersion medium to give a positive electrode mixture slurry. The binder is preferably polyvinylidene fluoride, and the dispersion medium is preferably N-methylpyrrolidone. A conductive agent such as graphite or carbon black is preferably added to the positive electrode mixture slurry. The positive electrode mixture slurry is applied onto a positive electrode current collector, and the wet film is dried to form a positive electrode mixture layer. During this process, part of the positive electrode current collector is left exposed from the positive electrode mixture layer. The positive electrode mixture layer is then compressed to a prescribed thickness with a roller, and the compressed electrode plate is cut to a prescribed size. Lastly, a positive electrode lead 15a is connected to the exposed portion of the positive electrode current collector.

The positive electrode active material may be a lithium transition metal composite oxide capable of storing and releasing lithium ions. Examples of the lithium transition metal composite oxides include those of the general formulas $LiMO_2$ (M is at least one of Co, Mi and Mn), $LiMn_2O_4$ and $LiFePO_4$. These materials may be used singly, or two or more may be used as a mixture. The material may contain at least one selected from the group consisting of Al, Ti, Mg and Zr, in addition to or in place of the transition metal element.

For example, the negative electrode plate 16 may be fabricated as follows. First, a negative electrode active material and a binder are kneaded to uniformity in a dispersion medium to give a negative electrode mixture slurry. The binder is preferably styrene butadiene (SBR) copolymer or polyvinylidene fluoride (PVdF), and the dispersion medium is preferably water. A thickening agent such as carboxymethylcellulose is preferably added to the negative electrode mixture slurry. The negative electrode mixture slurry is applied onto a negative electrode current collector, and the wet film is dried to form a negative electrode mixture layer. During this process, part of the negative electrode current collector is left exposed from the negative electrode mixture layer. The negative electrode mixture layer is then compressed to a prescribed thickness with a roller, and the compressed electrode plate is cut to a prescribed size. Lastly, a negative electrode lead 16a is connected to the exposed portion of the negative electrode current collector.

The negative electrode active material may be a carbon material or a metal material which each can store and release lithium ions. Examples of the carbon materials include graphites such as natural graphite and artificial graphite. Examples of the metal materials include silicon, tin and oxides of these metals. The carbon materials and the metal materials may be used singly, or two or more may be used as a mixture.

The separator 17 may be a microporous film based on a polyolefin such as polyethylene (PE) or polypropylene (PP). A single microporous film, or a stack of two or more such films may be used. In the case where the separator is a stack including two or more layers, it is preferable that a layer based on polyethylene (PE) having a low melting point be an intermediate layer, and polypropylene (PP) having excellent oxidation resistance be a surface layer. Further, inorganic particles such as aluminum oxide ($Al_2O_3$), titanium oxide ($TiO_2$) or silicon oxide ($SiO_2$) may be added to the separator. Such inorganic particles may be suspended within the separator or may be applied together with a binder onto the separator surface.

The nonaqueous electrolytic solution may be a solution of a lithium salt as an electrolyte salt in a nonaqueous solvent.

Some nonaqueous solvents that can be used are cyclic carbonate esters, chain carbonate esters, cyclic carboxylate esters and chain carboxylate esters. Preferably, two or more of these solvents are used as a mixture. Examples of the cyclic carbonate esters include ethylene carbonate (EC), propylene carbonate (PC) and butylene carbonate (BC). The cyclic carbonate esters may be substituted with fluorine in place of part of the hydrogen atoms, with examples including fluoroethylene carbonate (FEC). Examples of the chain carbonate esters include dimethyl carbonate (DMC), ethyl methyl carbonate (EMC), diethyl carbonate (DEC) and methyl propyl carbonate (MPC). Examples of the cyclic carboxylate esters include γ-butyrolactone (γ-BL) and γ-valerolactone (γ-VL). Examples of the chain carboxylate esters include methyl pivalate, ethyl pivalate, methyl isobutyrate and methyl propionate.

Examples of the lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$ and $Li_2B_{12}Cl_{12}$. Of these, $LiPF_6$ is particularly preferable. The concentration in the nonaqueous electrolytic solution is preferably 0.5 to 2.0 mol/L. $LiPF_6$ may be mixed with other lithium salt such as $LiBF_4$.

EXAMPLES

The cylindrical batteries discussed as an embodiment of the present invention will be described in greater detail based on specific examples.

Example 1

(Fabrication of Sealing Unit)

A valve member 12 and a metal plate 13 were fabricated by pressing aluminum plate materials. A sloping region 12a was disposed between an inner peripheral circle 12b with a radius of 7 mm and an outer peripheral circle 12c with a radius of 12 mm which were concentric with the outline of the valve member 12, the concentric circles defining the edges of the sloping region. This sloping region 12a was formed so that the thicknesses of the sloping region 12a on the inner peripheral side and the outer peripheral side, denoted T1 and T2 as illustrated in FIG. 3, were 0.3 mm for T1 and 0.2 mm for T2. While an annular insulating member 14 was disposed between an outer peripheral portion of the valve member 12 and an outer peripheral portion of the metal plate 13, the valve member 12 and the metal plate 13 were connected at their central portions. A sealing unit 11 illustrated in FIG. 2 was thus fabricated.

(Fabrication of Positive Electrode Plate)

To a dispersion medium were added 100 parts by mass of $LiNi_{0.8}Co_{0.15}Al_{0.05}O_2$ as a positive electrode active material, 1.7 parts by mass of polyvinylidene fluoride (PVdF) as a binder and 2.5 parts by weight of acetylene black as a conductive agent. The mixture was kneaded to give a positive electrode mixture slurry. The positive electrode mixture slurry was applied onto both sides of a positive electrode current collector composed of aluminum foil, and was dried to form positive electrode mixture layers. During this process, part of the positive electrode current collector was left exposed from the positive electrode mixture layers. The positive electrode mixture layers were then compressed to a prescribed thickness with a roller, and the compressed electrode plate was cut to a prescribed size. Lastly, a positive electrode lead 15a made of aluminum was connected to the exposed portion of the positive electrode current collector by ultrasonic welding. A positive electrode plate 15 was thus fabricated.

(Fabrication of Negative Electrode Plate)

To a dispersion medium were added 100 parts by mass of graphite as a negative electrode active material, 0.6 parts by mass of polyvinylidene fluoride (PVdF) as a binder and 1 part by weight of carboxymethylcellulose (CMC) as a thickening agent. The mixture was kneaded to give a negative electrode mixture slurry. The negative electrode mixture slurry was applied onto both sides of a negative electrode current collector composed of copper foil, and was dried to form negative electrode mixture layers. During this process, part of the negative electrode current collector was left exposed from the negative electrode mixture layers. The negative electrode mixture layers were then compressed to a prescribed thickness with a roller, and the compressed electrode plate was cut to a prescribed size. Lastly, a negative electrode lead 16a made of nickel was connected to the exposed portion of the negative electrode current collector by ultrasonic welding. A negative electrode plate 16 was thus fabricated.

(Preparation of Nonaqueous Electrolytic Solution)

A nonaqueous solvent was prepared by mixing ethylene carbonate (EC), dimethyl carbonate (DMC) and ethyl methyl carbonate (EMC). Lithium hexafluorophosphate ($LiPF_6$) as an electrolyte salt was dissolved into the nonaqueous solvent so that its concentration would be 1 mol/L. A nonaqueous electrolytic solution was thus prepared.

(Fabrication of Electrode Assembly)

The positive electrode plate 15 and the negative electrode plate 16 fabricated above were wound together via a separator 17 composed of a microporous polyolefin film, thus forming an electrode assembly 18.

(Fabrication of Nonaqueous Electrolyte Secondary Battery)

As illustrated in FIG. 1, a lower insulating plate 19 was placed under the electrode assembly 18, and the electrode assembly 18 was inserted into a bottomed cylindrical housing can 22. The negative electrode lead 16a was connected to the bottom of the housing can 22 by resistance welding. Next, an upper insulating plate 20 was placed on top of the electrode assembly 18, and a portion of the housing can 22 near the open end was plastically deformed to form a U-shaped groove 1.0 mm in width and 1.5 mm in depth in the circumferential direction. The positive electrode lead 15a was connected to the metal plate 13 by laser welding, and the sealing unit 11 was fitted into the groove of the housing can 22 via a gasket 21. A nonaqueous electrolyte secondary battery 10 was thus fabricated.

Examples 2 and 3

Nonaqueous electrolyte secondary batteries 10 of EXAMPLES 2 and 3 were fabricated in the same manner as in EXAMPLE 1, except that the thickness T2 of the sloping region 12a at the outer peripheral edge was changed to a value described in Table 1.

Comparative Example 1

A nonaqueous electrolyte secondary battery of COMPARATIVE EXAMPLE 1 was fabricated in the same manner as in EXAMPLE 1, except that the valve member was fabricated so that the region corresponding to the sloping region 12a in EXAMPLE 1 had a constant thickness of 0.2 mm (equal to T2 in EXAMPLE 1).

Comparative Example 2

A nonaqueous electrolyte secondary battery of COMPARATIVE EXAMPLE 2 was fabricated in the same manner as in EXAMPLE 2, except that the valve member was fabricated so that the region corresponding to the sloping region 12a in EXAMPLE 2 had a constant thickness of 0.195 mm (equal to T2 in EXAMPLE 2).

Comparative Example 3

A nonaqueous electrolyte secondary battery of COMPARATIVE EXAMPLE 3 was fabricated in the same manner as in EXAMPLE 3, except that the valve member was fabricated so that the region corresponding to the sloping region 12a in EXAMPLE 3 had a constant thickness of 0.205 mm (equal to T2 in EXAMPLE 3).

(Measurement of Actuation Pressure)

Ten batteries fabricated in each of EXAMPLES 1 to 3 and COMPARATIVE EXAMPLES 1 to 3 were provided and were charged to a state of charge of 30%. The sealing units were removed from the charged batteries and were tested to measure the actuation pressure of the current interrupt device in the sealing unit. The measurement of actuation pressure was performed as follows.

Figure 5:
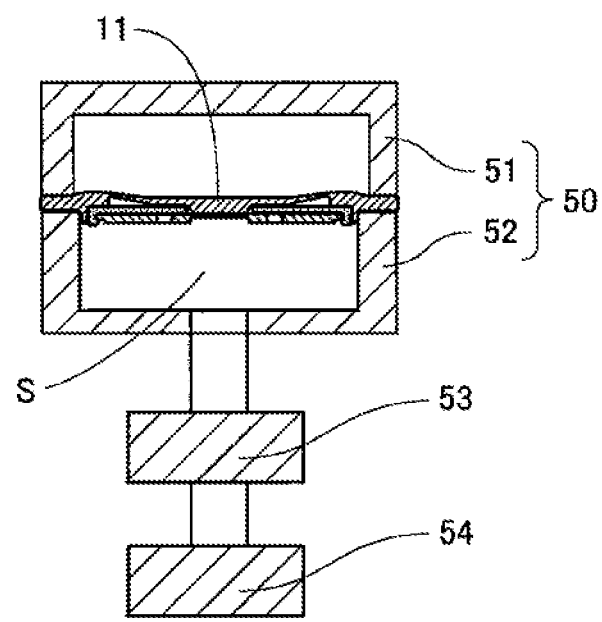
FIG. 5 is a schematic view illustrating an apparatus used for the measurement of actuation pressure.
Figure 6:
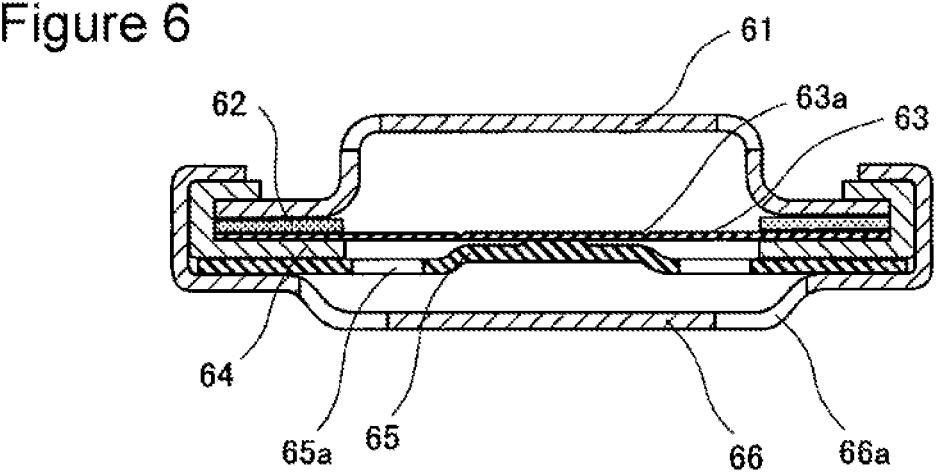
FIG. 6 is a sectional view of a conventional example sealing unit.

As illustrated in FIG. 5, the sealing unit was fixed to a fixing jig 50 having a pressing section 51 and a supporting section 52. The supporting section 52 was fixed to part of the measurement apparatus, and a pressing force was applied from above the pressing section 51 using an air cylinder so as to ensure the airtightness in the space S enclosed by the sealing unit and the supporting section 52. Nitrogen gas was supplied to the space S at a constant rate from a nitrogen gas tank 54 via a regulator 53.

During the supply of nitrogen gas, the pressure in the space S and the continuity of the current path between the valve member and the metal plate were checked in real time. The continuity of the current path was examined by connecting a pair of electrode terminals connected to a galvanometer to the pressing section 51 of the fixing jig 50 and the metal plate. The pressing section 51 was composed of a metal and was thus electrically connected to the valve member.

The pressure in the space S at which the current path between the valve member and the metal plate was interrupted during the supply of nitrogen gas was obtained as the actuation pressure of the current interrupt device of the sealing unit. From the actuation pressures measured in each of EXAMPLES 1 to 3 and COMPARATIVE EXAMPLES 1 to 3, the process capability index (Cpk) was calculated as an indicator of the variation in actuation pressure. The process capability index is a value obtained by dividing the difference between the standard value of actuation pressure and either of the upper limit and the lower limit of actuation pressure that is closer to the standard value, by 3×σ (standard deviation). The results are described in Table 1.

TABLE 1

| | Sloping region | Valve thicknesses (mm) in sloping region or region corresponding to sloping region | | Cpk of actuation pressure |
|---|---|---|---|---|
| | | T1 | T2 | |
| EX. 1 | Present | 0.3 | 0.2 | 2.21 |
| EX. 2 | Present | 0.3 | 0.195 | 1.56 |
| EX. 3 | Present | 0.3 | 0.205 | 1.93 |
| COMP. EX. 1 | Absent | 0.2 (constant thickness in the region) | | 1.23 |
| COMP. EX. 2 | Absent | 0.195 (constant thickness in the region) | | 0.60 |
| COMP. EX. 3 | Absent | 0.205 (constant thickness in the region) | | 1.13 |

Table 1 shows that the process capability indexes of EXAMPLES were significantly higher than those in COMPARATIVE EXAMPLES and the variations in actuation pressure in EXAMPLES were considerably decreased. The valve member of COMPARATIVE EXAMPLE 1 was such that the valve thickness was constant at T2 which was the minimum thickness in the sloping region of EXAMPLE 1. Because the valve thickness is smaller in COMPARATIVE EXAMPLE 1 than in EXAMPLE 1, the valve members of COMPARATIVE EXAMPLE 1 are more prone to deformation than the valve members of EXAMPLE 1. However, the variation in actuation pressure was significantly smaller in EXAMPLE 1 in which the sloping region was provided in the valves. This result shows that valve members provided with a sloping region as is the case in EXAMPLE 1 start to deform from the thinnest part and consequently the valve members tend to exhibit a similar deforming behavior. Similar results were obtained from the comparison of EXAMPLE 2 to COMPARATIVE EXAMPLE 2 and EXAMPLE 3 to COMPARATIVE EXAMPLE 3. That is, the advantageous effects of the present invention are attained by virtue of the presence of the sloping region.

The sloping regions in EXAMPLES 1 to 3 were formed so that the thickness of the valve member decreased continuously along the radial direction from an inner peripheral portion to an outer peripheral portion of the valve member. In the reverse case in which the sloping region is formed so that the thickness of the valve member increases from an inner peripheral portion to an outer peripheral portion of the valve member along the radial direction, the innermost peripheral portion of the sloping region will serve as an origin of a deformation of the valve member and thus the advantageous effects of the invention will be attained similarly.

While the embodiments of the present invention discussed above have illustrated nonaqueous electrolyte secondary batteries, the invention can be applied also to cylindrical batteries other than nonaqueous electrolyte secondary batteries, for example, to nickel hydrogen batteries.

INDUSTRIAL APPLICABILITY

As described hereinabove, the present invention can reduce the variation in the actuation pressure of current interrupt devices and thus can provide cylindrical batteries having excellent safety. In particular, the present invention is suited for applications in which cylindrical batteries with high energy density are used. Examples of such applications include power supplies for driving of, for example, compact electronic devices such as laptops, power tools such as electric tools and power-assisted bicycles, and electric vehicles.

REFERENCE SIGNS LIST

10 NONAQUEOUS ELECTROLYTE SECONDARY BATTERY
11 SEALING UNIT
12 VALVE MEMBER
12a SLOPING REGION
12b INNER PERIPHERAL CIRCLE CONCENTRIC WITH OUTLINE OF VALVE MEMBER
12c OUTER PERIPHERAL CIRCLE CONCENTRIC WITH OUTLINE OF VALVE MEMBER
12e OUTER PERIPHERAL PROJECTION
13 METAL PLATE
13a THIN PORTION
14 INSULATING MEMBER
15 POSITIVE ELECTRODE PLATE
16 NEGATIVE ELECTRODE PLATE
17 SEPARATOR
18 ELECTRODE ASSEMBLY
22 HOUSING CAN

The invention claimed is:

1. A cylindrical battery comprising an electrode assembly including a positive electrode plate and a negative electrode plate wound together via a separator, an electrolytic solution, a bottomed cylindrical housing can, and a sealing unit fixed by crimping of an open end of the housing can via a gasket,
the sealing unit including a valve member having a circular outline, a metal plate connected to a central portion of the valve member so as to be farther inside the battery than the valve member, and an annular insulating member disposed between an outer peripheral portion of the valve member and an outer peripheral portion of the metal plate,
the valve member having a sloping region in which the thickness decreases continuously from an inner peripheral portion to an outer peripheral portion along a radial direction,
wherein a length of a portion of the sloping region across which the thickness of the valve member decreases continuously along the radial direction of the valve member and is not less than 10% and not more than 90% of the radius of the valve member.

2. The cylindrical battery according to claim 1, wherein the sloping region occupies a region enclosed by two circles concentric with the outline of the valve member.

3. The cylindrical battery according to claim 1, wherein the valve member has a groove-shaped thin portion.

4. The cylindrical battery according to claim 1, wherein the metal plate is electrically connected to the electrode assembly via a lead.

5. The cylindrical battery according to claim 1, wherein the valve member is disposed outermost in the sealing unit.

6. The cylindrical battery according to claim 1, wherein the metal plate has a groove-shaped thin portion around a portion thereof welded to the valve member.

* * * * *